United States Patent
Fukui et al.

(10) Patent No.: US 8,115,355 B2
(45) Date of Patent: Feb. 14, 2012

(54) POLYGON MIRROR SCANNER MOTOR AND METHOD OF MANUFACTURING THE SAME

(75) Inventors: Yasushi Fukui, Tottori (JP); Masaki Sumi, Tottori (JP); Akimitsu Maetani, Tottori (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 579 days.

(21) Appl. No.: 12/440,535

(22) PCT Filed: Mar. 28, 2007

(86) PCT No.: PCT/JP2007/056666
§ 371 (c)(1),
(2), (4) Date: Mar. 9, 2009

(87) PCT Pub. No.: WO2008/068910
PCT Pub. Date: Jun. 12, 2008

(65) Prior Publication Data
US 2010/0001603 A1 Jan. 7, 2010

(30) Foreign Application Priority Data
Nov. 27, 2006 (JP) ................. 2006-318253

(51) Int. Cl.
*H02K 7/08* (2006.01)
*H02K 7/14* (2006.01)
*G02B 26/12* (2006.01)
(52) U.S. Cl. .......................... 310/90; 29/596
(58) Field of Classification Search ............ 310/89, 310/90; 29/596
See application file for complete search history.

(56) References Cited

U.S. PATENT DOCUMENTS

| 5,708,520 A | * | 1/1998 | Yoshitsugu et al. | ...... 359/200.1 |
| 5,901,013 A | * | 5/1999 | Lee et al. | .................. 360/99.08 |
| 6,175,174 B1 | * | 1/2001 | Takahashi | .................... 310/90.5 |
| 6,340,854 B1 | | 1/2002 | Jeong | |

(Continued)

FOREIGN PATENT DOCUMENTS
CN 1157838 C 7/2004
(Continued)

OTHER PUBLICATIONS
International Preliminary Report on Patentability dated Jun. 17, 2009.*

(Continued)

*Primary Examiner* — Quyen Leung
*Assistant Examiner* — David Scheuermann
(74) *Attorney, Agent, or Firm* — Brinks Hofer Gilson & Lione

(57) ABSTRACT

The rotor of this polygon mirror scanner motor is composed of a rotor magnet provided in the inner wall of a rotor frame, a rotor boss having a circular tube part and provided in the rotor frame, and a polygon mirror mounted on the rotor boss. The stator is composed of a stator core formed by laminating magnetic members and disposed oppositely to the rotor magnet, a stator coil wound in the stator core, and an iron plate circuit board having a through-hole. A dynamic pressure bearing is composed by forming a dynamic pressure groove in either one of the shaft fixed in the through-hole by laser welding, and the circular tube part of the rotor boss, and the circular tube part of the rotor boss is supported by the shaft.

6 Claims, 5 Drawing Sheets

U.S. PATENT DOCUMENTS

| | | | |
|---|---|---|---|
| 2004/0252923 A1* | 12/2004 | Mizusaki et al. | 384/279 |
| 2010/0001603 A1* | 1/2010 | Fukui et al. | 310/90 |
| 2010/0220374 A1* | 9/2010 | Sumi et al. | 359/216.1 |

FOREIGN PATENT DOCUMENTS

| | | |
|---|---|---|
| CN | 2744457 Y | 12/2005 |
| JP | 60-87987 A | 5/1985 |
| JP | 3-63617 A | 3/1991 |
| JP | 7-336970 A | 12/1995 |
| JP | 9-131032 A | 5/1997 |
| JP | 2000-333404 A | 11/2000 |
| JP | 2001-78407 A | 3/2001 |
| JP | 2002-239849 A | 8/2002 |
| JP | 2002250888 A * | 9/2002 |
| JP | 2004-90030 A | 3/2004 |
| JP | 2005-20835 A | 1/2005 |
| JP | 2008136261 A * | 6/2008 |

OTHER PUBLICATIONS

JP 2000-333404 trans Nov. 2011.*

JP 2001-78407 trans Nov. 2011.*

JP 2005-20835 trans Nov. 2011.*

International Search Report issued Jun. 5, 2007 in International application No. PCT/JP2007/056666, 2 pages.

* cited by examiner

POLYGON MIRROR SCANNER MOTOR AND METHOD OF MANUFACTURING THE SAME

TECHNICAL FIELD

The present invention relates to a polygon mirror scanner motor having a dynamic pressure bearing device. More particularly it relates to a fixing structure and a fixing method between members where a high mounting precision is demanded.

BACKGROUND ART

Recently, the polygon mirror scanner motor is demanded to be smaller in size, thinner in thickness, and lower in cost along with the spreading use of the laser beam printer (LBP). At the same time, it is also requested to decrease the rotation fluctuation (jitter) and noise. Besides, maintenance of high precision is required for preventing plane tilting of the polygon mirror.

Conventionally, as shown in patent document 1, for example, it has been attempted to reduce the thickness and lower the cost by a structure of fitting a bearing to an iron base plate. The bearing has been enhanced in precision and extended in service life by using a fluid bearing, which is a kind of dynamic pressure bearing.

FIG. 4 is a sectional view of a polygon mirror scanner motor in conventional example 1 disclosed in patent document 1. In FIG. 4, rotor boss 402 is fixed to rotary shaft 401 by shrinkage fitting or other method. Polygonal rotating mirror 403 and rotor frame 404 are fixed to rotor boss 402. Rotor magnet 405 is fixed to the inner wall of rotor frame 404. Rotary shaft 401, rotor boss 402, polygonal rotating mirror 403, rotor frame 404, and rotor magnet 405 are combined to constitute rotor 400.

Stator base plate 411 of the polygon mirror scanner motor shown in FIG. 4 has a mounting portion for mounting the polygon mirror scanner motor on a device. Stator base plate 411 is formed of an iron base plate high in thermal conductivity.

Stator core 412 is formed by laminating magnetic members. Stator coil 413 is wound on stator core 412. Stator core 412 and stator coil 413 are combined to constitute winding assembly 414. Stator base plate 411 is provided with driving IC 415 for operating the polygon mirror scanner motor. Stator base plate 411, winding assembly 414, and driving IC 415 are combined to constitute stator assembly 410. Stator core 412 and rotor magnet 405 face each other across a gap.

Bearing 420 is inserted from the backside of stator base plate 411, and is directly crimped to stator core 412. In the inner wall of bearing 420, herringbone grooves are formed as dynamic pressure grooves, and bearing 420 composes a fluid bearing. Rotary shaft 401 is inserted into bearing 420, and bearing 420 supports to rotate rotary shaft 401.

When a current flows in stator coil 413, a rotary torque is generated between stator core 412 and rotor magnet 405. As a result, rotor 400 is put into rotation.

Along with rotation of rotor 400, polygonal rotating mirror 403 is also put into rotation. By rotation of polygonal rotating mirror 403, a wind is generated. By the cooling effect of this wind, the heat generated from bearing 420 is released from stator core 412 and stator base plate 411. As a result, the bearing performance is enhanced in the polygon mirror scanner motor shown in FIG. 4.

Further, by the cooling effect of the wind, the heat generated from driving IC 415 can be also released, and deterioration of the performance of driving IC 415 can be prevented.

The polygon mirror scanner motor disclosed in patent document 1 is a shaft rotation type, that is, rotary shaft 401 is supported and rotated by bearing 420. Other type is a polygon mirror scanner motor of shaft fixed type, that is, the bearing inserted to and supported by a fixed shaft rotates about the fixed shaft.

This polygon mirror scanner motor of shaft fixed type includes a plane opposed type motor in which a plurality of flat coils are disposed oppositely to a flat plate type rotor magnet. In this plane opposed type motor, it is attempted to reduce the thickness by integrally forming the flat plate rotor magnet, the rotor yoke, and the polygonal rotating mirror, for example, as proposed in patent document 2.

FIG. 5 is sectional view of a polygon mirror scanner motor in conventional example 2 disclosed in patent document 2. In FIG. 5, rotating polyhedron 510 has flat plate rotor magnet 511 and rotor yoke 512 disposed in its inside, and mirror surface 513 is formed on the outer circumference. A plurality of flat plate coils 521 are opposite to flat plate rotor magnet 511 across a gap, and are disposed on control base plate 522. Control base plate 522 is installed on mounting board 523 which serves also as bracket and back yoke.

In the center of mounting board 523, through-hole 524 is formed. Concave peripheral groove 526 formed on fixed shaft 525 is fitted to the peripheral edge of this through-hole 524, and fixed shaft 525 is held on mounting board 523.

In the center of rotating polyhedron 510, circular tube part 514 is formed. At both ends of circular tube part 514 in the axial direction, bearing 515 and bearing 516 are fitted. Circular tube part 514 is supported on fixed shaft 525 by way of bearing 515 and bearing 516.

In this construction, rotating polyhedron 510 is disposed nearly in the center of the axial direction of fixed shaft 525. Moreover, bearing 515 and bearing 516 are disposed at both ends of circular tube part 514, and the bearing is composed in two-side support structure. In this construction, the motor shown in FIG. 5 can rotate smoothly at high speed.

Along with the wide spread of the LBP, high speed and colorization of the LBP are demanded, and the polygon mirror scanner motor is demanded to increase the speed further from 30,000 to 50,000 $min^{-1}$.

The bearing structure of the conventional polygon mirror scanner motor disclosed in patent document 1 is a so-called one-side support structure, and had a problem of "grinding motion." In particular, in rotation at high speed from 30,000 to 50,000 $min^{-1}$ the grinding motion gives serious effects on the dynamic pressure bearing, and the bearing life is shortened extremely. To solve this problem, the diameter of the rotary shaft must be increased to enhance the rigidity of the dynamic pressure bearing, but it causes other problems, such as increase of bearing loss, increase of power consumption, and increase in motor size.

The conventional polygon mirror scanner motor disclosed in patent document 2 is excellent in the bearing construction of two-side support structure. However, since the plane opposed type motor system is employed, when changing the energized phase, an attracting repulsive force is generated in the axial direction between flat plate rotor magnet 511 and flat plate coil 521. In particular, in rotation at high speed, large vibration or noise is generated.

Mirror surface 513 is formed on the outer circumference of rotating polyhedron 510 integrally forming circular tube part 514 accommodating bearing 515 and bearing 516, flat plate rotor magnet 511, and rotor yoke 512. Because of this construction, it is extremely difficult to form a mirror surface of high precision.

As the means for solving the problems, the following construction may be considered. First, the problem of large vibration or noise occurring in rotation at high speed may be solved by a structure in which the torque generating part of the conventional polygon mirror scanner motor disclosed in patent document 1, that is, the structure of stator assembly 410 and rotor 400 in FIG. 4 is replaced by the plane opposed type motor structure of patent document 2.

Next, in rotor boss 402 of patent document 1, a structure corresponding to circular tube part 514 of rotating polyhedron 510 of patent document 2 is formed. In the inner wall of this circular tube part, herringbone grooves are formed as dynamic pressure grooves, and a fluid bearing is composed together with the fixed shaft. Thus, by composing the shaft fixed type fluid bearing structure for rotating rotor boss 402 about the fixed shaft, a bearing structure close to the two-side support structure is realized. This construction solves the problems of large effects of grinding motion on the dynamic pressure bearing in rotation at high speed, and shortening of bearing life.

Moreover, same as in patent document 1, polygonal rotating mirror 403 (mirror) having mirror surface 513 isolated from rotating polyhedron 510 of patent document 2 is fixed to rotor boss 402. In this construction, polygonal rotating mirror 403 can be processed independently, and the problem of difficulty in manufacture of mirror surface of high precision can be solved.

Actually, a polygon mirror scanner motor having such construction is proposed, for example, in patent document 3. FIG. 6 is a sectional view of the polygon mirror scanner motor in conventional example 3.

In FIG. 6, annular protrusion 602 is formed on bracket 601. Stator core 603 is fixed to annular protrusion 602. Stator coil 604 is wound on stator core 603. Bracket 601 is mounted and fixed on iron plate circuit board 605. Fixed shaft 606 is pressed and fixed into the central part of bracket 601.

Hub 611 is provided with sleeve bearing 612 of circular tube shape projecting downward. Herringbone grooves are formed in the inner wall of sleeve bearing 612. By the herringbone grooves and a lubricant poured in a slight gap between fixed shaft 606 and sleeve bearing 612, a dynamic pressure is generated at the time of rotation of the motor. As a result, fixed shaft 606 supports sleeve bearing 612 rotatably.

Rotor 614 is mounted on outer wall 613 of sleeve bearing 612. Polygonal rotating mirror 615 of square shape is installed in the upper part of hub 611. Polygonal rotating mirror 615 is pressed and fixed from above by clamping spring 616.

However, in the polygon mirror scanner motor shown in FIG. 6, in the central part of bracket 601, the pressing and fixing part of fixed shaft 606 is formed on the backside of iron plate circuit board 605 by projecting largely. Accordingly, this polygon mirror scanner motor is hardly reduced in size and thickness.

Accordingly, in the polygon mirror scanner motor shown in FIG. 5, in the fixing structure of fixed shaft 525 and mounting board 523, there is no member projecting largely on the backside of mounting board 523, and it may be considered as means for solving the problem of reduction of size and thickness.

However, the polygon mirror scanner motor shown in FIG. 5 has a fixing structure of only fitting and holding the peripheral edge of through-hole 524 formed in the center of mounting board 523, to concave peripheral groove 526 formed in fixed shaft 525. It is hence difficult to ensure the verticality of fixed shaft 525 to mounting board 523, especially to keep precision of plane tilting of mirror surface 513, and the fixing strength is not sufficient.

Meanwhile, as means for fixing the shaft and the flat plate firmly without applying large external force, a method of crimping and fixing the shaft and the flat plate by using laser light is proposed. For example, the method disclosed in patent document 4 is considered as a method of solving the above problems.

FIG. 7A is an essential sectional view of crimping portion before laser light irradiation in the conventional crimping method using laser light, and FIG. 7B is an essential sectional view of crimping portion after laser light irradiation in the conventional crimping method using laser light.

In FIG. 7A, mounting hole 702 is formed in one member 701 of plate shape, and chamfering part 703 on its peripheral edge. On other member 711 of columnar shape, small end 712 fitted to mounting hole 702, and flange 713 of wide diameter are formed. After member 701 and member 711 are assembled, laser light 720 is emitted to end face 714 of small end 712. As a result, as shown in FIG. 7B, part 715 of small end 712 is melted, and is fluidized in the direction of chamfering part 703 of one member 701, and is solidified. By this fluidized part 715 and flange 713, other member 711 is completely solidified in one member 701, and is crimped in the axial direction.

In the conventional method, however, the flange is needed in order to fix the plate member and the columnar member at right angle, and the squareness depends on the precision of the flange and the plate member. Further, in the fluid bearing, an extremely high precision is required in the diameter crossing of the shaft corresponding to the columnar member and in the surface roughness, and when the shaft is formed on the flange, it is hard to satisfy the required precision.

Patent document 1: Japanese Unexamined Patent Application Publication No. H9-131032
Patent document 2: Japanese Unexamined Patent Application Publication No. H3-63617
Patent document 3: Japanese Unexamined Patent Application Publication No. H7-336970
Patent document 4: Japanese Unexamined Patent Application Publication No. S60-87987

DISCLOSURE OF THE INVENTION

The polygon mirror scanner motor of the present invention includes a rotor, a winding assembly, a stator, a shaft, and a dynamic pressure bearing. The rotor is composed of a rotor frame, a rotor magnet provided in the inner wall of the rotor frame, a rotor boss having a circular tube part and provided in the rotor frame, and a polygon mirror mounted on the rotor boss. The winding assembly is composed of a stator core formed by laminating magnetic members and disposed oppositely to the rotor magnet, and a stator coil wound on the stator core. The stator is composed of the winding assembly, and an iron plate circuit board having a through-hole. The shaft is fixed to the through-hole by laser welding. The dynamic pressure bearing is provided with a dynamic pressure groove, for generating a dynamic pressure in the radial direction, in either one of the circular tube part of the rotor boss and the shaft. The circular tube part of the rotor boss is supported by the shaft.

In this construction, the torque generating part of the motor is formed in a peripheral opposed structure having a core, and the rotor mounting the polygon mirror is supported by the dynamic pressure bearing of the shaft fixed structure. This construction is applicable to small size and high-speed rotation. Moreover, the shaft can be fixed directly to the iron plate circuit board by laser welding, and firm fixing is assured. As a result, thin design and low cost are realized together with high reliability.

The manufacturing method of the polygon mirror scanner motor of the present invention includes the following steps. A step is provided for pressing and fixing the mounting surface of the iron plate circuit board for mounting the polygon mirror scanner motor on a device, at a specified pressure to a jig. A step is provided for forming at right angle to the pressing face of the jig, inserting a shaft into a hole of a diameter slightly larger than the diameter of the shaft, and holding in a fixed state. A step is provided for emitting laser simultaneously to plural positions divided equally on the circumference of the junction between the shaft and the iron plate circuit board, welding on the whole circumference by rotating, and fixing the shaft to the iron plate circuit board. By this method, the squareness of the shaft and the iron plate circuit board can be assured at a high precision.

DESCRIPTION OF REFERENCE MARKS

Figure 1:
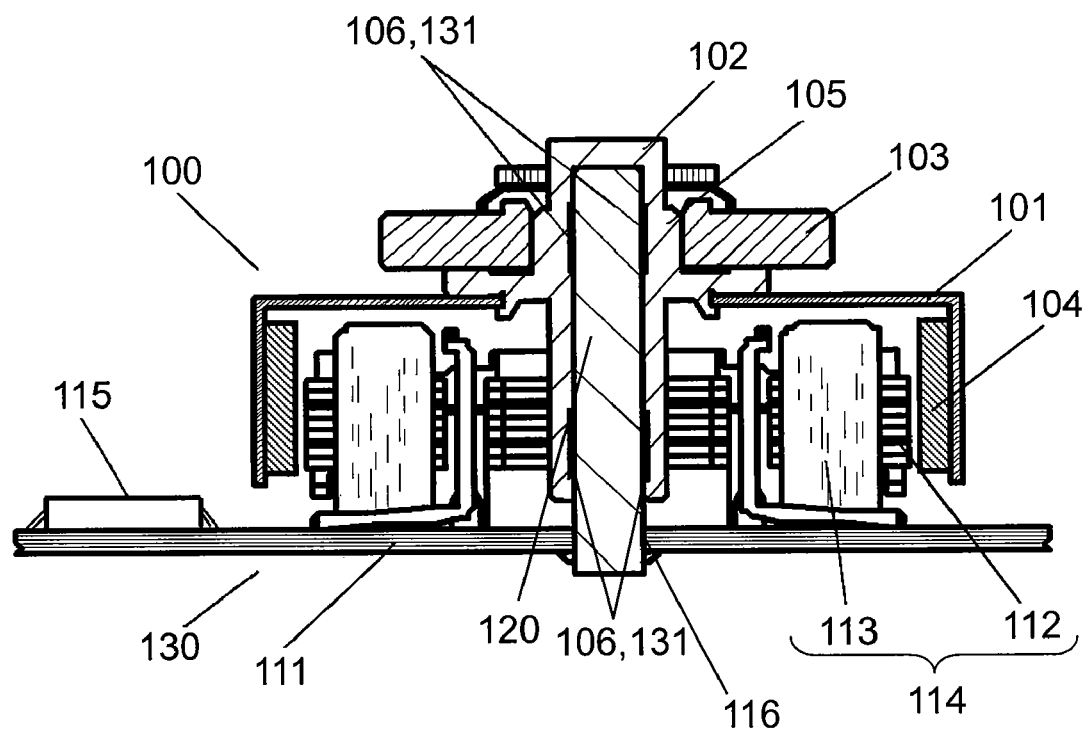
FIG. 1 is a sectional view of a polygon mirror scanner motor in preferred embodiment 1 of the present invention.

100 Rotor
101 Rotor frame
102 Rotor boss
103 Polygon mirror (polygonal rotating mirror)
104 Rotor magnet
105 Circular tube part
106 Dynamic pressure groove
111 Iron plate circuit board
111a Mounting surface
112 Stator core
113 Stator coil
114 Winding assembly
115 Driving IC
116 Through-hole
117 Junction
118 Irradiation point
119 Final irradiation point
120 Shaft
130 Stator
131 Dynamic pressure bearing
200 Jig
201 Circuit board pressing surface
202 Clamp
203 Holder
203a Holding surface
203b, 203c Movable part
204 Receiving surface
210 Laser
220 Pressing surface of jig
P Protruding amount

PREFERRED EMBODIMENTS FOR CARRYING OUT THE INVENTION

Referring now to the drawings, preferred embodiments for carrying out the present invention are specifically described below.

Preferred Embodiment 1

FIG. 1 is a sectional view of a polygon mirror scanner motor in preferred embodiment 1 of the present invention. In FIG. 1, a principal construction of the polygon mirror scanner motor in preferred embodiment 1 of the present invention is explained.

The polygon mirror scanner motor in preferred embodiment 1 includes rotor 100, winding assembly 114, stator 130, shaft 120, and dynamic pressure bearing 131. Rotor 100 is composed of rotor frame 101, rotor magnet 104 mounted on the inner wall of rotor frame 101, rotor boss 102 having circular tube part 105 and mounted on rotor frame 101, and polygon mirror (polygonal rotating mirror) 103 mounted on rotor boss 102. Winding assembly 114 is composed of stator core 112 formed by laminating magnetic members and disposed oppositely to rotor magnet 104, and stator coil 113 wound on stator core 112. Stator 130 is composed of winding assembly 114, and iron plate circuit board 111 forming through-hole 116. Shaft 120 is fixed to iron plate circuit board 111 by laser welding in through-hole 116. Dynamic pressure bearing 131 is provided with dynamic pressure groove 106 for generating a dynamic pressure in the radial direction in either one of circular tube part 105 of rotary boss 102 and shaft 120. Circular tube part 105 of rotary boss 102 is supported by shaft 120.

The construction of the polygon mirror scanner motor in preferred embodiment 1 is described specifically below by referring to FIG. 1 and FIG. 2A to FIG. 2E.

Figure 2A:
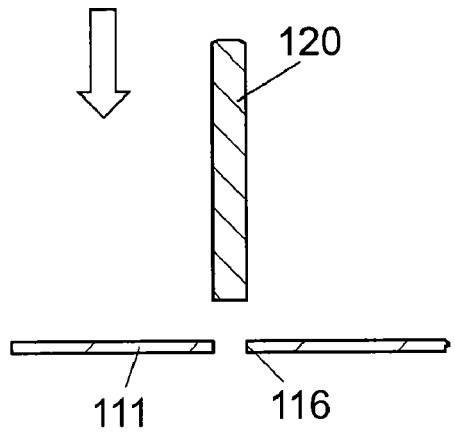
FIG. 2A is a sectional view before insertion of a shaft of the polygon mirror scanner motor shown in FIG. 1 into an iron plate circuit board.
Figure 2B:
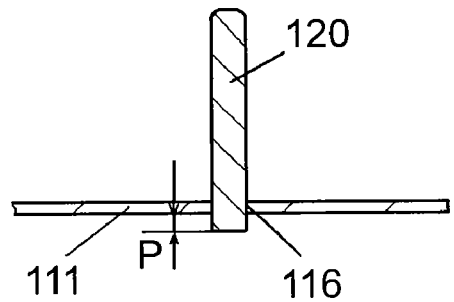
FIG. 2B is a sectional view after insertion of the shaft of the polygon mirror scanner motor shown in FIG. 1 into the iron plate circuit board.
Figure 2C:
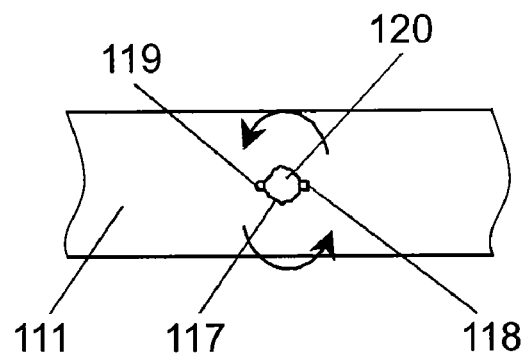
FIG. 2C is a plan view for explaining a step of laser welding of the shaft of the polygon mirror scanner motor shown in FIG. 1 to the iron plate circuit board.
Figure 2D:
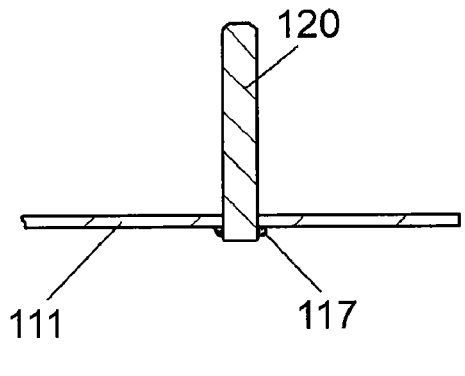
FIG. 2D is a sectional view after laser welding of the shaft of the polygon mirror scanner motor shown in FIG. 1 to the iron plate circuit board.
Figure 2E:
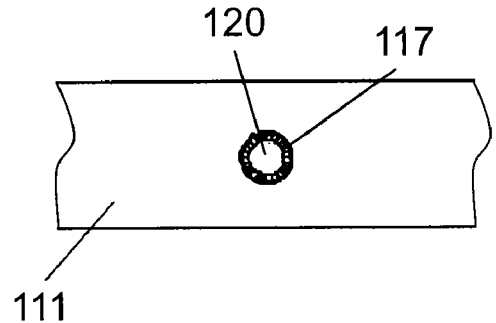
FIG. 2E is a plan view after laser welding of the shaft of the polygon mirror scanner motor shown in FIG. 1 to the iron plate circuit board.

FIG. 2A is a sectional view before insertion of a shaft of the polygon mirror scanner motor shown in FIG. 1 into the iron plate circuit board, FIG. 2B is a sectional view after insertion of the shaft of the polygon mirror scanner motor shown in FIG. 1 into the iron plate circuit board, FIG. 2C is a plan view for explaining a step of laser welding of the shaft of the polygon mirror scanner motor shown in FIG. 1 to the iron plate circuit board, FIG. 2D is a sectional view after laser welding of the shaft of the polygon mirror scanner motor shown in FIG. 1 to the iron plate circuit board, and FIG. 2E is a plan view after laser welding of the shaft of the polygon mirror scanner motor shown in FIG. 1 to the iron plate circuit board.

In FIG. 1, rotor boss 102 is inserted into a hole formed in the center of rotor frame 101. This rotor boss 102 is provided with polygon mirror 103. Rotor magnet 104 is fixed to the inner wall of rotor frame 101. Thus, rotor 100 is constituted.

Iron plate circuit board 111 formed of an iron material has a mounting part for fitting the polygon mirror scanner motor on a device. Stator core 112 is formed by laminating magnetic members. Stator coil 113 is wound on stator core 112. Winding assembly 114 is formed stator core 112 and stator coil 113. Stator core 112 and rotor magnet 104 face each other across a gap. Stator 130 is composed of winding assembly 114 and iron plate circuit board 111. Driving IC 115 for operating the polygon mirror scanner motor is mounted on iron plate circuit board 111.

Through-hole 116 is formed in the center of iron plate circuit board 111. Shaft 120 is inserted into this through-hole 116. At the backside of iron plate circuit board 111, by laser welding with the junction of shaft 120 and through-hole 116, the both are fixed firmly.

On the other hand, rotor boss 102 has circular tube part 105 in its center. In the inner wall of this circular tube part 105, herringbone grooves are formed as dynamic pressure grooves 106 at two positions apart from each other in the axial direction. Shaft 120 is inserted in this circular tube part 105, the space between the inner wall of circular tube part 105 and shaft 120 is packed with a lubricant, and a dynamic pressure fluid bearing in radial direction is formed. Thus, shaft 120 of stator 130 rotatably supports circular tube part 105 of rotor 100.

Dynamic pressure grooves 106 (herringbone grooves) formed at two positions in the inner wall of circular tube part 105 are formed at positions corresponding to the fixing positions of polygon mirror 103 of rotor boss 102. Herein, two positions of dynamic pressure grooves 106 are formed in the inner wall of circular tube part 105 of rotor boss 102, but two positions of dynamic pressure grooves 106 may be also formed in shaft 120.

In other words, polygon mirror 103 is installed on the outer wall of circular tube part 105 of rotor boss 102, and at least dynamic pressure groove 106 is formed in the inner wall of circular tube part 105 corresponding to the axial direction range in which polygon mirror 103 is installed on the outer wall.

Referring to FIG. 2A to FIG. 2E, a manufacturing method of the polygon mirror scanner motor in preferred embodiment 1 shown in FIG. 1 is explained.

The manufacturing method of the polygon mirror scanner motor of the present invention includes the following steps. A step is provided for pressing and fixing the mounting surface of iron plate circuit board 111 for mounting the polygon mirror scanner motor on a device, at a specified pressure to a jig. A step is provided for forming at right angle to the pressing face of the jig, inserting shaft 120 into a hole (through-hole 116) of a diameter slightly larger than the diameter of shaft 120, and holding in a fixed state. A step is provided for emitting laser simultaneously to plural positions divided equally on the circumference of junction 117 between shaft 120 and iron plate circuit board 111, welding on the whole circumference by rotating, and fixing shaft 120 to iron plate circuit board 111.

A further specific description is added. As shown in FIG. 2A, when inserting shaft 120 into through-hole 116 formed in iron plate circuit board 111, protruding amount P of shaft 120 is only slight from the backside (welding side) of iron plate circuit board 111 as shown in FIG. 2B. Therefore, the motor can be reduced in size and thickness, and a space allowance is provided in the projecting portion at the device side for mounting the motor. As a result, the space of the device can be saved. The clearance of through-hole 116 and shaft 120 is set at about 0.001 to 0.8 mm at one side.

In this state, as shown in FIG. 2C, laser is emitted continuously to irradiation point 118 at two positions simultaneously in junction 117 of through-hole 116 and shaft 120, and is rotated to final irradiation position 119 by rotating 180 degrees or more on the circumference. Thus, the whole circumference of junction 117 is continuously welded by laser, and shaft 120 is fixed to iron plate circuit board 111.

FIG. 2D is a sectional view of fixed state of shaft 120 on iron plate circuit board 111 by laser welding, and FIG. 2E is a plan view thereof.

By this construction, in a peripheral opposed structure in which the torque generating part of the motor is opposite to stator core 112 and rotor magnet 104 in the peripheral direction, the vibration and noise generated in the axial direction in rotation at high speed are decreased substantially.

Rotor 100 mounting polygon mirror 103 is supported by a dynamic pressure bearing of shaft fixed structure. It hence solves the problem of one-side support structure in the bearing structure of the conventional polygon mirror scanner motor disclosed in patent document 1 because it can be supported only at a position remote from the lower side of polygon mirror 103.

In the polygon mirror scanner motor shown in FIG. 1, one of two herringbone grooves is formed in the inner wall of circular tube part 105 of rotor boss 102 including the fixing portion of polygon mirror 103. That is, one of the herringbone grooves is formed in the inner wall of circular tube part 1 OS of rotor boss 102 positioned at the upper side in the axial direction of rotor frame 101. By this construction, the bearing structure is close to the two-side support structure, and the grinding motion in rotation at high speed can be suppressed. As a result, effects on dynamic pressure bearing in rotation at high speed can be lessened, and a long life of the bearing is realized.

The other herringbone groove is formed in the inner wall of circular tube part 105 of rotor boss 102 positioned at the lower side in the axial direction of rotor frame 101.

Since shaft 120 protrudes only slightly from the backside (weld side) of iron plate circuit board 111, at the device side where the motor is finally installed, a space allowance is available in the protruding portion, which contributes to space saving of the device.

Further, since shaft 120 is directly fixed to iron plate circuit board 111 by laser welding, and the component protruding largely to the backside of iron plate circuit board 111 is omitted, and the fixing is firm. As a result, a polygon mirror scanner motor high in reliability, small in thickness, and low in cost is presented.

Preferred Embodiment 2

Figure 3:
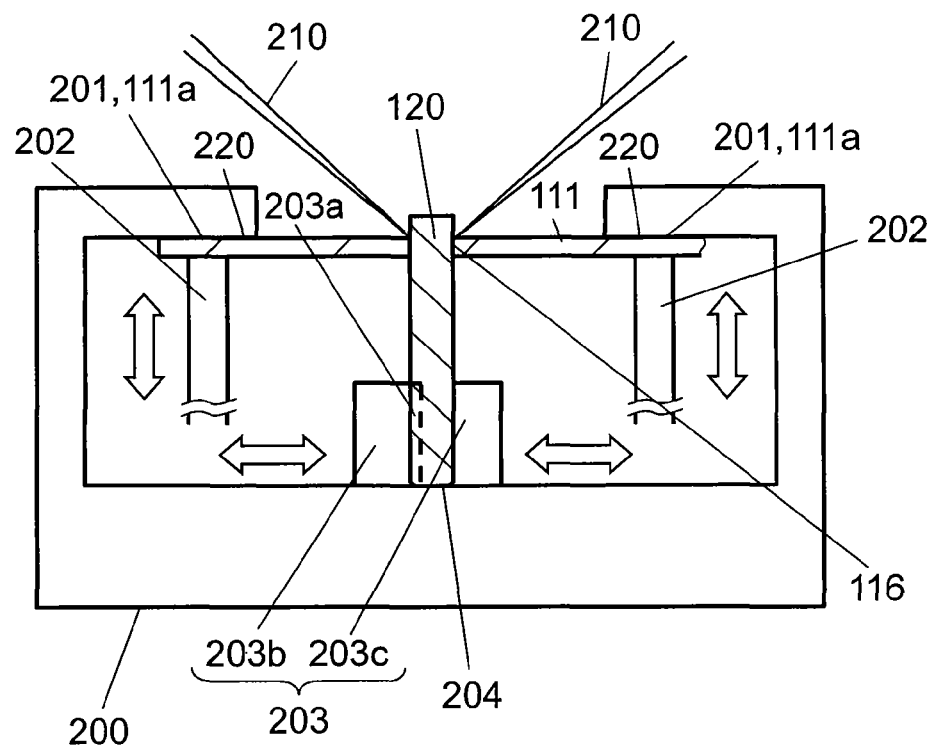
FIG. 3 is a sectional view of a jig used in a manufacturing method of polygon mirror scanner motor in preferred embodiment 2 of the present invention.
Figure 4:
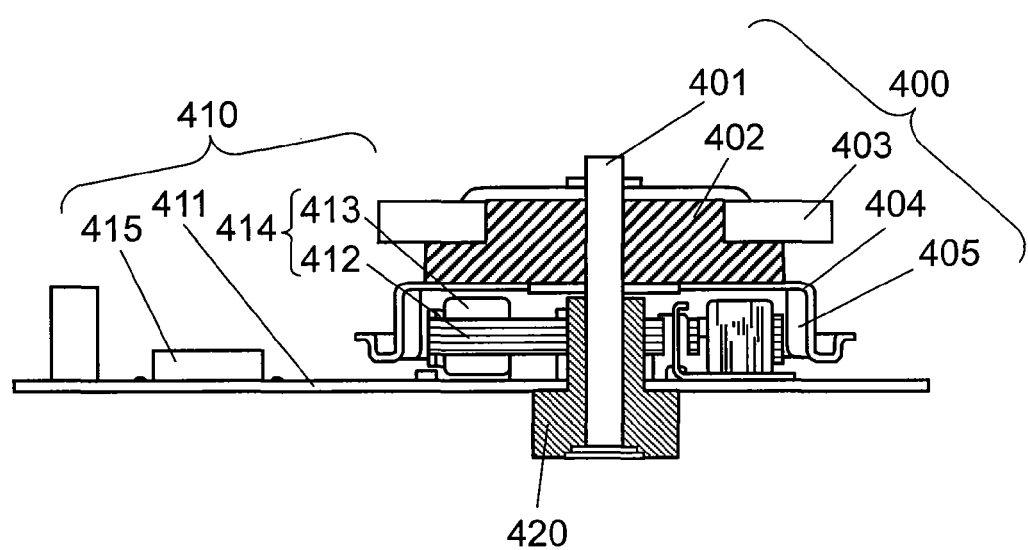
FIG. 4 is a sectional view of a polygon mirror scanner motor in conventional example 1.
Figure 5:
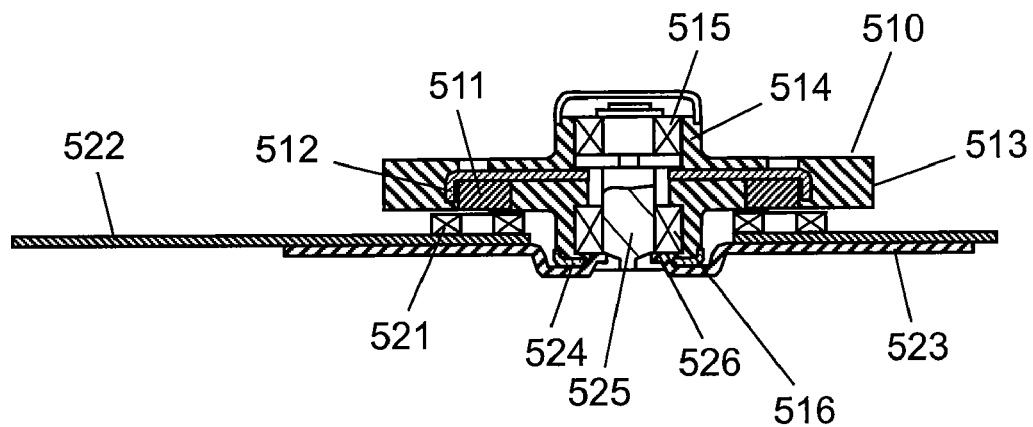
FIG. 5 is a sectional view of a polygon mirror scanner motor in conventional example 2.
Figure 6:
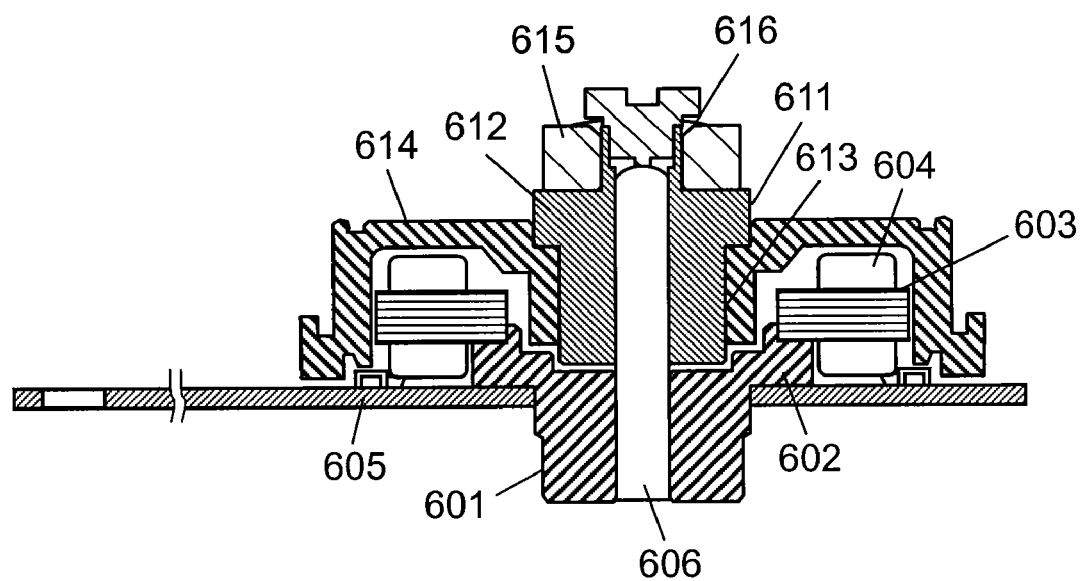
FIG. 6 is a sectional view of a polygon mirror scanner motor in conventional example 3.
Figure 7A:
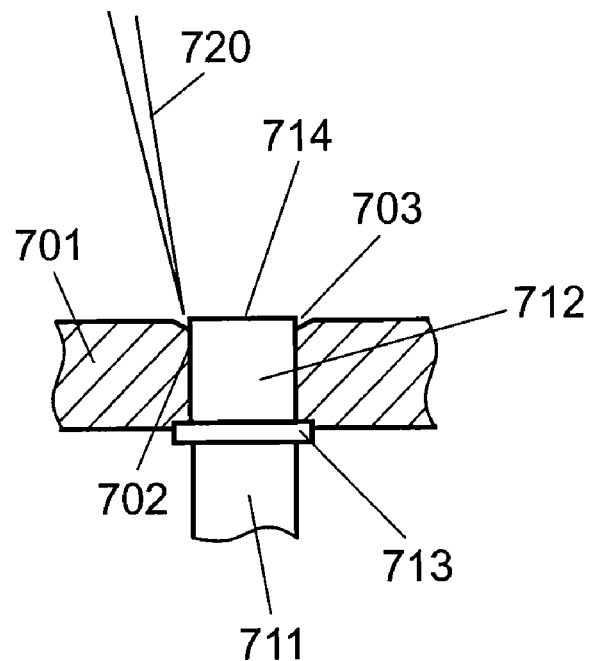
FIG. 7A is an essential sectional view of crimping portion before laser light irradiation in a conventional crimping method using laser light.
Figure 7B:
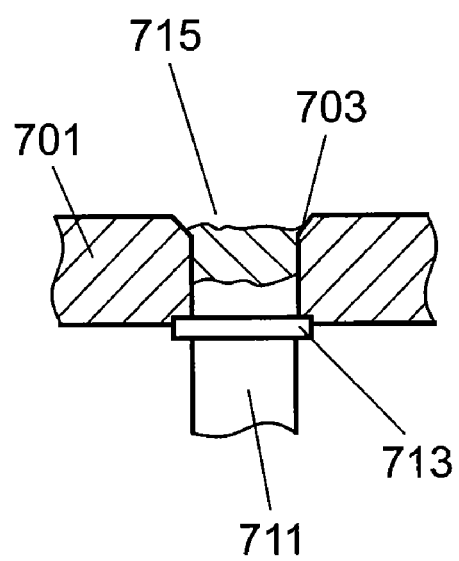
FIG. 7B is an essential sectional view of crimping portion after laser light irradiation in the conventional crimping method using laser light.

Referring now to FIG. 3, a manufacturing method of polygon mirror scanner motor in preferred embodiment 2 of the present invention is described. FIG. 3 is a sectional view of a jig used in the manufacturing method of polygon mirror scanner motor in preferred embodiment 2.

Jig 200 includes clamp 202 for pressing iron plate circuit board 111 to pressing surface 220 of the jig, and holder 203 for holding shaft 120 at right angle to pressing surface 220 of the jig. Holder 203 holds shaft 120 by grabbing pressing surface 220 of the jig in parallel from both sides. Jig 200 also has a closing mechanism (not shown) for opening and closing holder 203, and a moving mechanism (not shown) for moving clamp 202 vertically in the axial direction.

The manufacturing method of polygon mirror scanner motor of preferred embodiment 2 of the present invention operates in the following steps by using jig 200. A step is provided for pressing iron plate circuit board 111 to pressing surface 220 of the jig by means of clamp 202. A step is provided for inserting shaft 120 into through-hole 116 of iron plate circuit board 111 in an opened state of holder 203 from the side of pressing surface 220 of the jig. A step is provided for fixing the junction of shaft 120 and through-hole 116 of iron plate circuit board 111 by laser welding by grabbing and holding shaft 120 by holder 203.

A further specific description is added. As shown in FIG. 3, jig 200 includes pressing surface 220 of the jig for pressing iron plate circuit board 111, clamp 202 for pressing iron plate circuit board 111 to pressing surface 220 of the jig, and holder 203 for holding shaft 120 at right angle to circuit board pressing surface 201. Clamp 202 is designed to be moved up and down in the axial direction by a moving mechanism (not shown).

Holder 203 is composed of a pair of movable part 203b and movable part 203c, and one movable part 203b is provided with holding surface 203a of V-groove shape processed at high precision at right angle to circuit board pressing surface 201. Holding surface 203a of this movable part 203b is designed to face other movable part 203c. By moving movable part 203b and movable part 203c mutually in opposite directions in parallel to circuit board pressing surface 201 by means of a closing mechanism (not shown), the gap of mutually facing movable part 203b and movable part 203c can be adjusted.

In jig 200 having such construction, its operation and action are explained below. First, clamp 202 of jig 200 is lowered to the lower side in the axial direction, and a space for mounting iron plate circuit board 111 is provided. At this time, the pair of movable part 203b and movable part 203c of holder 203 are set in an opened state for allowing shaft 120 to be inserted easily.

Next, iron plate circuit board 111 is mounted on jig 200 so that mounting surface 111a for mounting the motor of iron plate circuit board 111 on a device may face pressing surface 220 of the jig. By raising clamp 202 to the upper side in the axial direction, mounting surface 111a is pressed and fixed to pressing surface 220 of the jig. In succession, shaft 120 is inserted until abutting against receiving surface 204 of jig 200 at one leading end of shaft 120 from the side of mounting surface 111a into through-hole 116 of iron plate circuit board 111. In this state, other leading end of shaft 120 is protruding by a specified amount from the side of mounting surface 111a. Moving in a direction of narrowing the gap of movable part 203b and movable part 203c of holder 203, shaft 120 is pressed and held on holding surface 203a. By pressing shaft 120 to holding surface 203a already adjusted in precision of right angle to circuit board pressing surface 201, the precision of right angle of iron plate circuit board 111 and shaft 120 can be set at high precision regardless of the precision of the components.

By rotating the entire structure of jig 200, as show in FIG. 2C, junction 117 of through-hole 116 and shaft 120 is irradiated with laser 210 emitted simultaneously to two irradiation points 118, and by emitting and rotating continuously up to final irradiation point 119 rotated by more than 180 degrees on the circumference, and the entire circumference is welded and fixed.

As clear from the description herein, in the polygon mirror scanner motor of the present invention, only shaft 120 protrudes by a minimum required amount to the side of mounting surface 111a for mounting the motor of iron plate circuit board 111 to the device, shaft 120 and iron plate circuit board 111 can be fixed at a sufficient strength and a high precision of right angle. As a result, the reliability is high, and a thin structure is realized.

With shaft 120 held at right angle to mounting surface 111a of iron plate circuit board 111 by means of jig 200, the junction of shaft 120 and iron plate circuit board 111 are rotated, and welded and fixed by emitting laser 210 simultaneously from plural positions on the circumference. By this manufacturing method, the right angle of shaft 120 and iron plate circuit board 111 can be maintained at high precision.

In the foregoing preferred embodiments, as shown in FIG. 1, polygon mirror 103 is fixed to rotor boss 102, but same effects are obtained by aligning polygon mirror 103 by rotor boss 102, and mounting and fixing polygon mirror 103 on the top of rotor frame 101.

INDUSTRIAL APPLICABILITY

The polygon mirror scanner motor and its manufacturing method of the present invention are particularly applicable to the small-size and thin-type polygon mirror scanner motor for high-speed rotation where high mounting precision and light bearing load are demanded.

The invention claimed is:

1. A polygon mirror scanner motor comprising:
    a rotor composed of a rotor frame, a rotor magnet provided in the inner wall of the rotor frame, a rotor boss having a circular tube part and provided in the rotor frame, and a polygon mirror mounted on the rotor boss,
    a winding assembly composed of a stator core formed by laminating magnetic members and disposed oppositely to the rotor magnet, and a stator coil wound on the stator core,
    a stator composed of the winding assembly, and an iron plate circuit board having a through-hole,
    a shaft fixed to the through-hole by laser welding, and
    a dynamic pressure bearing provided with a dynamic pressure groove for generating a dynamic pressure in the radial direction, in either one of the circular tube part of the rotor boss and the shaft,
    wherein the circular tube part of the rotor boss is supported by the shaft.

2. The polygon mirror scanner motor according to claim 1, wherein the polygon mirror is mounted on the outer wall of the circular tube part of the rotor boss, and at least the dynamic pressure groove is formed in the inner wall of the circular tube part facing the axial direction range in which the polygon mirror is mounted on the outer wall.

3. A manufacturing method of the polygon mirror scanner motor of claim 1, comprising:
    a step of pressing and fixing a mounting surface of the iron plate circuit board for mounting the polygon mirror scanner motor on a device, at a specified pressure to a pressing surface of a jig,
    a step of forming at right angle to a pressing surface of the jig, inserting the shaft into a hole of a diameter slightly larger than the diameter of the shaft, and holding in a fixed state, and
    a step of emitting laser simultaneously to plural positions divided equally on the circumference of the junction between the shaft and the iron plate circuit board, welding on the whole circumference by rotating, and fixing the shaft to the iron plate circuit board.

4. A manufacturing method of the polygon mirror scanner motor of claim 2, comprising:
- a step of pressing and fixing a mounting surface of the iron plate circuit board for mounting the polygon mirror scanner motor on a device, at a specified pressure to a pressing surface of a jig,
- a step of forming at right angle to a pressing surface of the jig, inserting the shaft into a hole of a diameter slightly larger than the diameter of the shaft, and holding in a fixed state, and
- a step of emitting laser simultaneously to plural positions divided equally on the circumference of a junction between the shaft and the iron plate circuit board, welding on the whole circumference by rotating, and fixing the shaft to the iron plate circuit board.

5. A manufacturing method of the polygon mirror scanner motor of claim 3, wherein the jig includes a clamp for pressing the iron plate circuit board to a pressing surface of the jig, a holder for holding the shaft at right angle to a pressing surface of the jig by grabbing the pressing surface of the jig in parallel from both sides, a closing mechanism for opening and closing the holder, and a moving mechanism for moving the clamp vertically in the axial direction, and by using the jig, the method comprises:
- a step of pressing the iron plate circuit board to a pressing surface of the jig by means of the clamp,
- a step of inserting the shaft into the through-hole of the iron plate circuit board in an opened state of the holder from the side of pressing surface of the jig, and
- a step of fixing the junction of the shaft and the through-hole of the iron plate circuit board by laser welding by grabbing and holding the shaft by the holder.

6. A manufacturing method of the polygon mirror scanner motor of claim 4, wherein the jig includes a clamp for pressing the iron plate circuit board to a pressing surface of the jig, a holder for holding the shaft at right angle to a pressing surface of the jig by grabbing the pressing surface of the jig in parallel from both sides, a closing mechanism for opening and closing the holder, and a moving mechanism for moving the clamp vertically in the axial direction, and by using the jig, the method comprises:
- a step of pressing the iron plate circuit board to a pressing surface of the jig by means of the clamp,
- a step of inserting the shaft into the through-hole of the iron plate circuit board in an opened state of the holder from the side of pressing surface of the jig, and
- a step of fixing the junction of the shaft and the through-hole of the iron plate circuit board by laser welding by grabbing and holding the shaft by the holder.

* * * * *